J. S. HOPSON.
AUTOMOBILE WHEEL HOLDING DEVICE.
APPLICATION FILED JUNE 28, 1915.
1,191,599.
Patented July 18, 1916.
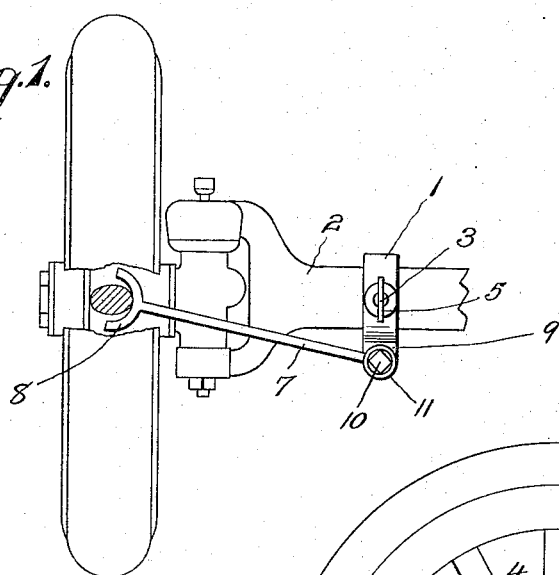
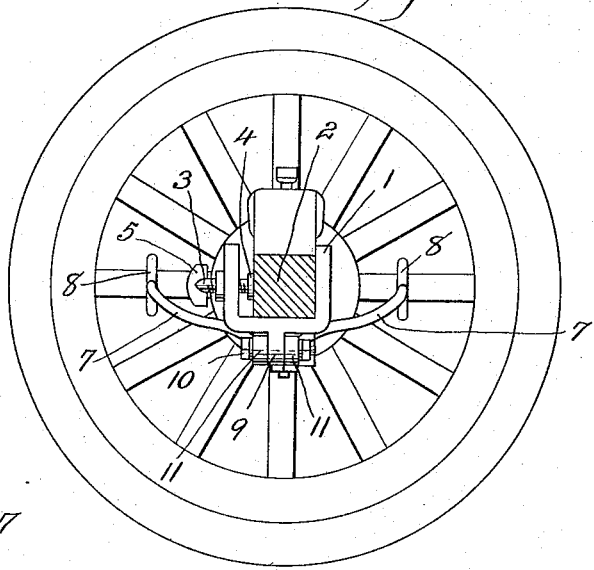
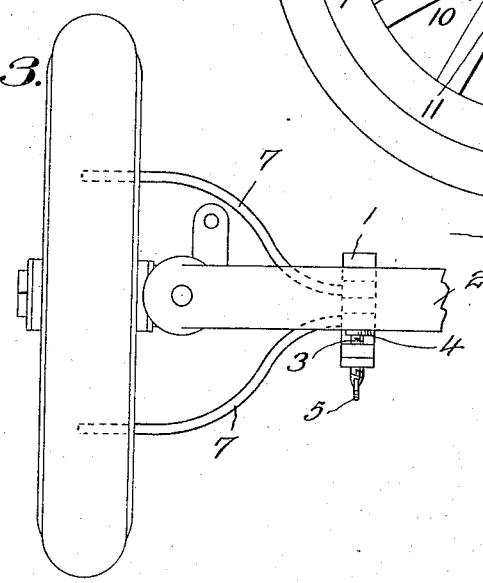
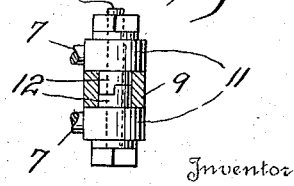
Witnesses
J. F. Britt
Reid Stanton
Inventor
John S. Hopson,
By O. C. Duprelau
Attorneys

UNITED STATES PATENT OFFICE.

JOHN STEELE HOPSON, OF ASHEVILLE, NORTH CAROLINA.

AUTOMOBILE-WHEEL-HOLDING DEVICE.

1,191,599.  Specification of Letters Patent.  Patented July 18, 1916.

Application filed June 28, 1915. Serial No. 36,743.

*To all whom it may concern:*

Be it known that I, JOHN S. HOPSON, a citizen of the United States, residing at Asheville, in the county of Buncombe and State of North Carolina, have invented certain new and useful Improvements in Automobile-Wheel-Holding Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in appliances particularly applicable to automobiles.

The invention has for its object to provide for holding the front swiveled or steering wheels against any rotary movement, as experienced when removing or applying a tire.

A further object is to provide for carrying out the aforesaid end in a simple, effective inexpensive manner and with facility.

The invention consists therefore of a device adapted to overcome the indicated annoyance or trouble, the same being arranged to provide temporarily a rigid connection between the wheel and the corresponding portion of the wheel-axle, all substantially as hereinafter more fully disclosed and defined by the appended claims.

In the accompanying drawing, illustrative of the preferred embodiment of my invention, wherein it is understood that various changes and modifications may be made as to the detailed construction and arrangement of the parts without departing from the spirit of the invention, Figure 1 is a fragmental elevational view, partly in section, of so much of an automobile steering or front wheel and its axle-connection as is considered requisite to show the application of my invention thereto. Fig. 2 is a similar view of the same, also partly in section, the latter being taken transversely through the rigid portion of the wheel-axle or axle proper. Fig. 3 is a plan view thereof, the axle proper being shown fragmental, and Fig. 4 is a detailed, partly plan and partly sectional, view of the same.

In carrying out my invention, I employ a bracket or clamp 1, adapted to provide for its application to the front axle 2 of an automobile or vehicle, from the underside, as shown particularly in Fig. 2, said bracket being preferably of U-form, and equipped with a clamping thumb-screw 3. The thumb or set screw 3 is provided at its inner end with a disk or washer-like member or foot 4 to afford a broad bearing therefor upon the axle, said thumb or set screw also being provided with a thumb-piece 5 for its convenient grasping.

Duplicate, preferably outwardly divergent arms 7 are suitably connected at their inner ends to the bracket or clamp 1, as presently explained, their outer divergent ends being provided with arcuate terminals or portions 8 adapted to be engaged with alining spokes of the automobile or vehicle wheel as clearly shown in Fig. 1. This arrangement, it is apparent, provides for effecting inflexible connection between the wheel and the rigid portion of the axle, or axle proper, which, of course, will lock the wheel and axle together and accordingly hold the wheel against casual rotary movement for facilitating the removal or application of a tire, as already indicated.

The connection between the inner ends of the arms 7 and the bracket 1 is effected preferably by providing a pendent extension or stud 9 upon the bottom of said bracket, through an opening in which stud is inserted a bolt 10, also inserted through apertures in said ends of said arms 7, these ends of the arms being formed with annular terminals or enlargements 11, themselves being formed with tubular interlocking clutch-members 12 to retain the arms 7 in operative position upon said bolt, all as seen particularly in Fig. 4.

From the foregoing taken in connection with the accompanying illustration, it will be seen that I have provided an exceedingly simple and inexpensive device and one, however, which is highly effective for its indicated purpose.

I claim—

1. A device of the type described, including a pair of arms applicable to the spokes of the front wheels of an automobile or other vehicle on each side of the hub of the wheel, said arms including means for direct engagement with the spokes of the wheel to positively hold the wheel against both rotative and swinging movement and means for attachment of said arms to the wheel axle.

2. A device of the type described, including a bracket equipped for attachment to the axle of an automobile or other vehicle, and arms connected to said bracket and applicable to the spokes of the guiding or front wheel of an automobile or other vehicle, said arms including means for direct engagement with the spokes of the wheel to positively prevent both rotative and swinging movement of the wheel.

3. A device of the type described, including a bracket equipped for attachment to a vehicle-axle, and arms connected to said bracket and having divergent portions adapted for engagement with the wheel-spokes, the connection between said arms and said bracket comprising a bolt inserted through said arms, and a pendent stud on said bracket, said arms having tubular interlocking clutch-members which also receive said bolt.

In testimony whereof, I affix my signature, in presence of two witnesses.

JOHN STEELE HOPSON.

Witnesses:
CORNELIA OSBORNE,
GEO. H. SMATHERS.

Copies of this patent may be obtained for five cents each, by addressing the "Commissioner of Patents, Washington, D. C."